(12) United States Patent
Chao

(10) Patent No.: US 8,319,441 B2
(45) Date of Patent: Nov. 27, 2012

(54) ROAD LAMP DIMMING CONTROL DEVICE

(75) Inventor: Ren-Cheng Chao, Taoyuan (TW)

(73) Assignee: Trend Lighting Corp., Taoyuan, Taoyuan County (TW)

( * ) Notice: Subject to any disclaimer, the term of this patent is extended or adjusted under 35 U.S.C. 154(b) by 369 days.

(21) Appl. No.: 12/817,454

(22) Filed: Jun. 17, 2010

(65) Prior Publication Data
US 2011/0309756 A1      Dec. 22, 2011

(51) Int. Cl.
*H05B 37/00* (2006.01)
(52) U.S. Cl. .................. 315/156; 315/158; 315/307
(58) Field of Classification Search .............. 315/149, 315/158, 159, 156, 157, 291, 307, 308
See application file for complete search history.

(56) References Cited

U.S. PATENT DOCUMENTS

| 6,392,368 | B1 * | 5/2002 | Deller et al. | 315/317 |
| 8,143,804 | B2 * | 3/2012 | Ger et al. | 315/291 |

* cited by examiner

*Primary Examiner* — David H Vu
(74) *Attorney, Agent, or Firm* — Jackson IPG PLLC

(57) ABSTRACT

A road lamp dimming control device comprises a signal processor, a power supplier, a driver and a light emitting module. The single processor is used for receiving an inputted electric current and a control signal. The control signal is decoded into a dimming control signal that then is transmitted to the power supplier. The power supplier converts the inputted electric current into constant current based upon the dimming control signal. The driver receives the constant current to drive the light emitting module to allow the light emitting module having different brightness based upon the control signal, thereby performing multi-stage variation.

9 Claims, 4 Drawing Sheets

ROAD LAMP DIMMING CONTROL DEVICE

BACKGROUND OF THE INVENTION

1. Field of the Invention

The present invention relates to a road lamp dimming control device, and more particularly to a road lamp dimming control device capable of regulating the brightness of a light emitting module based upon a control signal.

2. Description of the Related Art

As shown in FIG. 1, a control switch module 10 for controlling a LED (light emitting diode) road lamp comprises a grid-connected power 11, a constant-current transformer 12, a brightness switching device 13 and a LED light source 14. The foregoing operation is that alternating current power supplied from the grid-connected power 11 is converted by the constant current transformer 12 into direct current (DC) constant current power, and the brightness switching device 13 then controls the light source of the LED road lamp after receiving a signal transmitted from the constant current transformer 12.

Although the control switch module 10 can smoothly control the light source device of the LED road lamp, the providing of the control switch module merely turns on the light source of the LED road lamp and stabilizes its power. The switch of turning on the LED road lamp takes time-setting as a turn-on signal. However, once the LED road lamp is turned on, it is only controlled by hours set from the turn-on time, and other LED road lamps may not be regulated by utilizing the foregoing setting. Consequently, energy saving effect cannot be achieved while emphasizing environmental protection in the era.

SUMMARY OF THE INVENTION

In view of the shortcomings of the prior art, the inventor of the present invention based on years of experience in the related industry to conduct extensive researches and experiments, and finally developed a road lamp dimming control device.

Therefore, it is a primary objective of the present invention to overcome the aforementioned shortcoming and deficiency of the prior art by providing a road lamp dimming control device.

To achieve the foregoing objective, the road lamp dimming control device comprises a signal processor, a power supplier, a driver and a light emitting module. The signal processor is used for receiving an inputted electric current and a control signal. The control signal is decoded into a dimming control signal that then is transmitted to the power supplier. The power supplier converts the inputted electric current into constant current based upon the dimming control signal. The driver receives the constant current to drive the light emitting module to allow the light emitting module having different brightness based upon the control signal, thereby performing multi-stage variation.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
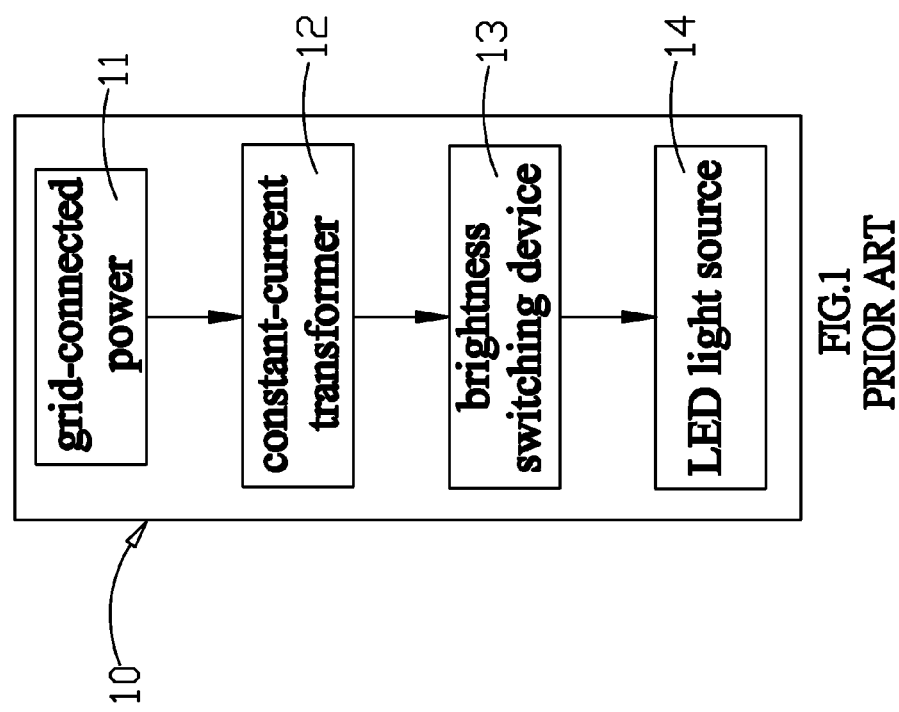
FIG. 1 is a structural diagram of a conventional regulating device for lamp brightness.
Figure 2:
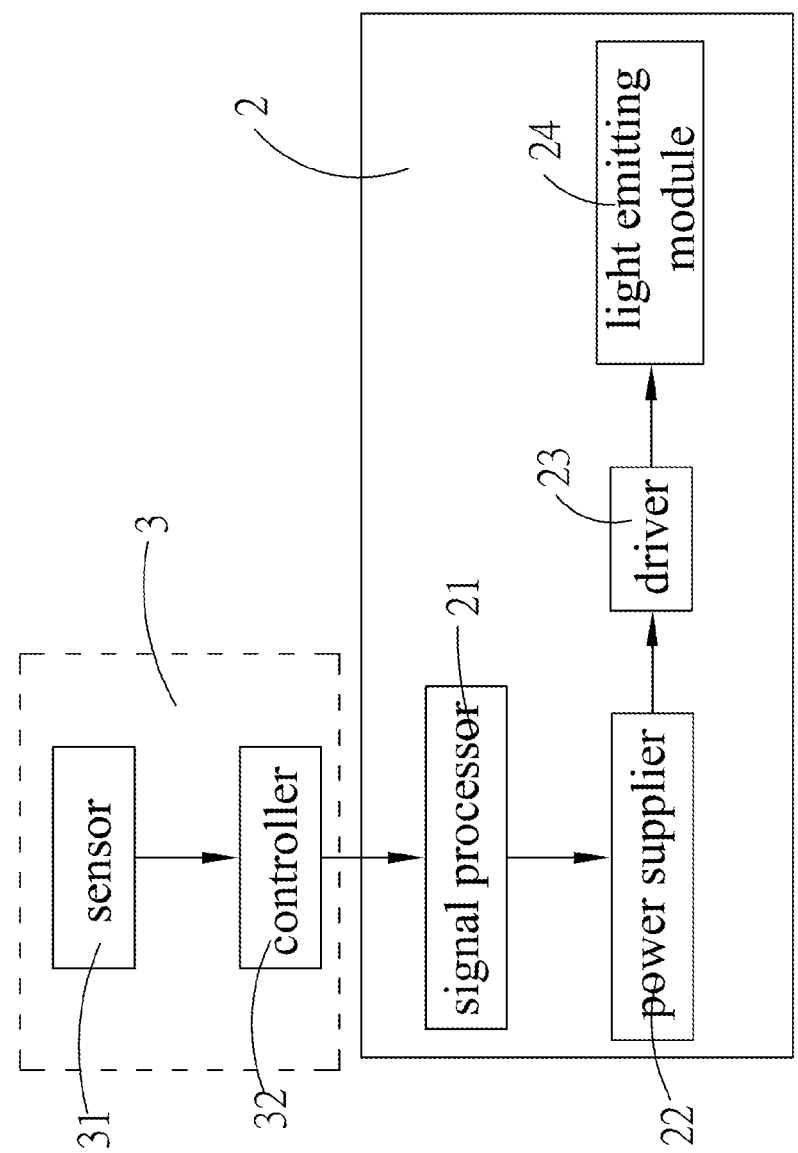
FIG. 2 is a structural diagram of a dimming control device according to the present invention.
Figure 3:
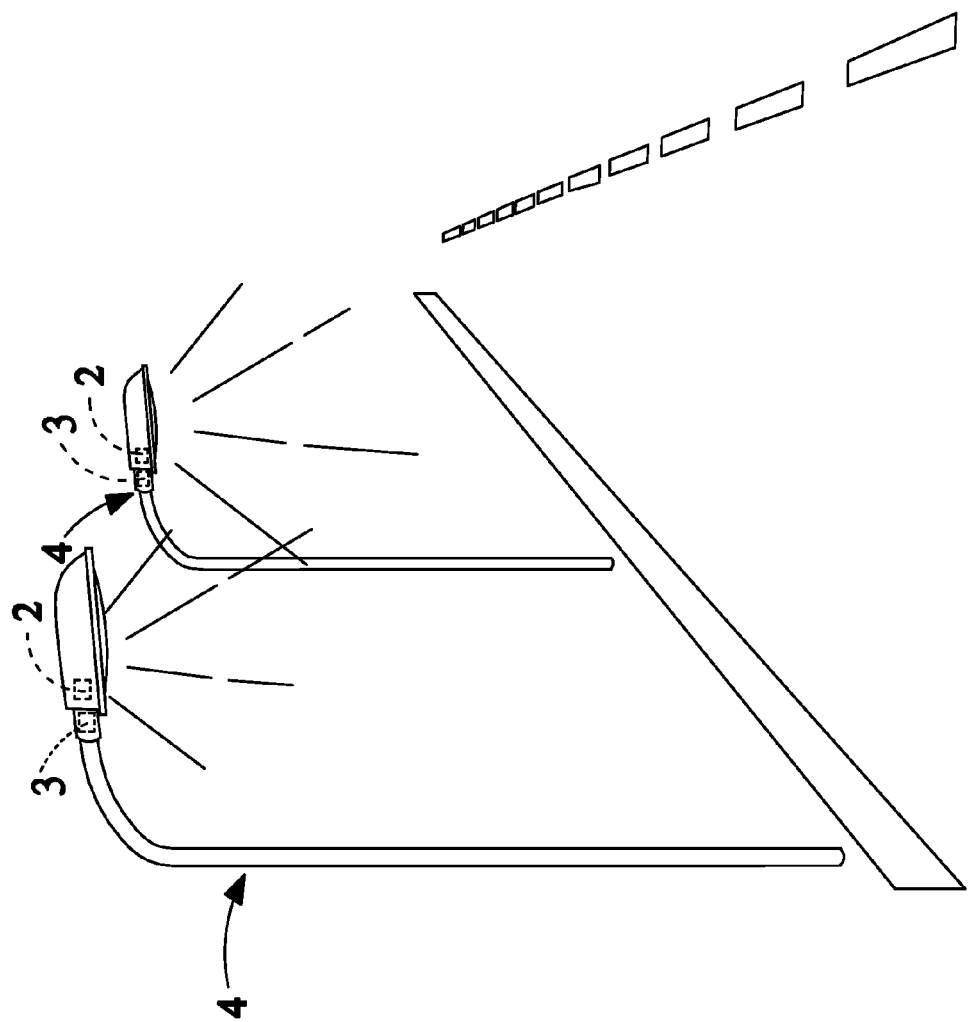
FIG. 3 is a structural diagram of a dimming device and a road lamp according to the present invention.

With reference to FIG. 2 and FIG. 3 for a road lamp dimming control device 2 of the invention comprises a signal processor 21 for receiving an inputted electric current and a control signal; a power supplier 22, connected to the signal processor 21, for receiving the inputted electric current and a dimming control signal; a driver 23, connected to the power supplier 22, for driving a light emitting module 24 connected to the driver 23 and having a plurality of light emitting diodes.

While in use, the road lamp dimming control device further has a control component 3. The control component 3 is connected to the signal processor 21 to control the control signal. The control component 3 is equipped with at least one sensor 31 (it can be a light beam sensor) and a controller 32 connected to the sensor 31. The control component 3 can be a power line network module that performs information transmission through power lines, such as LonWorks (a protocol for controlling data transmission between power lines of network system) or a SCP module (simple control protocol).

The sensor 31 is used to sense environment vitiation such as the variation of sensing light beams, and a sensing result then is transmitted to the controller 32 through the sensor 31. The signal processor 21 receives the inputted electric current and the control signal, and the control signal is decoded to form a dimming control signal (it can be a pulse width modulation signal). The power supplier 22 is connected to the signal processor 21 to receive the inputted electric current and the dimming control signal and allows the inputted electric current to form a constant current based upon the dimming control signal. Finally, the driver receives the constant current. The light emitting module then is driven to emit light through the constant current. Accordingly, the brightness of the light emitting module can be regulated according to the sensing result.

Moreover, the light emitting module can have a plurality of LED lamp strings connected in parallel. When the power supplier simultaneously supplies the constant current, the light emitting state of each LED lamp string can be known. The power supplier is further connected to a monitoring device for monitoring the light emitting state of the light emitting module to determine whether or not malfunction takes place.

Figure 4:
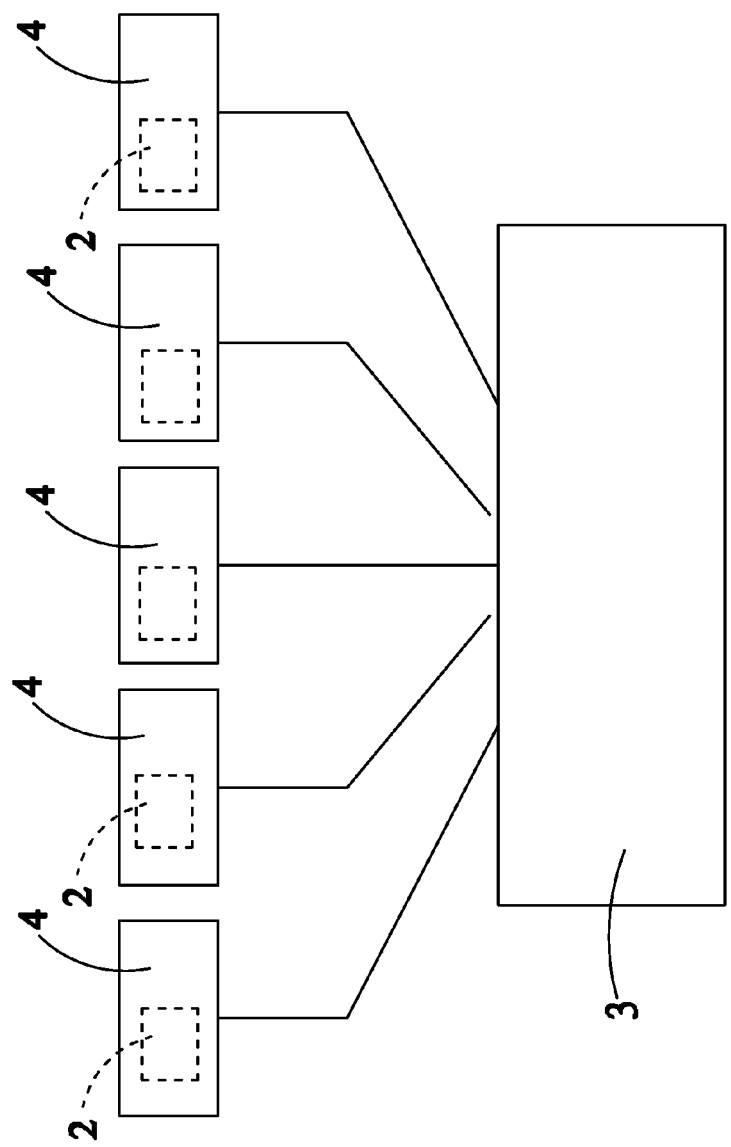
FIG. 4 is another structural diagram of a dimming device and a road lamp according to the present invention.

In addition, the road lamp dimming control device can be disposed in a road lamp. A single road lamp can be correspondingly controlled by a control component. Of course, a plurality of road lamps can also be controlled by a control component. As shown in FIG. 4, the control component 3 can control the plurality of road lamps 4 at the same road so that the brightness of each road lamp 4 can be controlled based upon different control signals. For example, when weather or environmental changes are darker, each road lamp 4 can be controlled to have higher brightness, thereby providing better illumination for the roads.

Specifically, the invention is an intelligent dimming system. The system can control the brightness of the road lamps based upon the change of road environments to provide the optimum illumination effect. The power consumption can be reduced as well.

The present invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A road lamp dimming control device comprising:
   a signal processor for receiving an inputted electric current and a control signal and for decoding the control signal into a dimming control signal;
   a power supplier, connected to the signal processor, for receiving the inputted electric current and the dimming control signal and for converting the inputted electric current into a constant current based upon the dimming control signal; and
   a driver, connected to the power supplier, for receiving the constant current to drive a light emitting module connected to the driver.

2. The road lamp dimming control device as recited in claim 1, wherein the road lamp dimming control device further has a control component, and the control component is connected to the signal processor to provide the control signal.

3. The road lamp dimming control device as recited in claim 2, wherein the control component has at least one sensor and a controller connected to the sensor, and the sensor transmits a sensing result to the controller, and the controller sends the control signal to regulate a brightness of the light emitting module based upon the sensing result.

4. The road lamp dimming control device as recited in claim 3, wherein the sensor is a light beam sensor.

5. The road lamp dimming control device as recited in claim 3, wherein the control component is a power line network module performing information transmission through a power line.

6. The road lamp dimming control device as recited in claim 4, wherein the power line network module is a LonWorks module or SCP (simple control protocol) module.

7. The road lamp dimming control device as recited in claim 1, wherein the dimming control signal is a pulse width modulation (PWM) signal.

8. The road lamp dimming control device as recited in claim 1, wherein the light emitting module has a plurality of light emitting diodes.

9. The road lamp dimming control device as recited in claim 1, wherein the power supplier further has a monitoring device for monitoring a light emitting state of the light emitting module.

* * * * *